Figure 1:
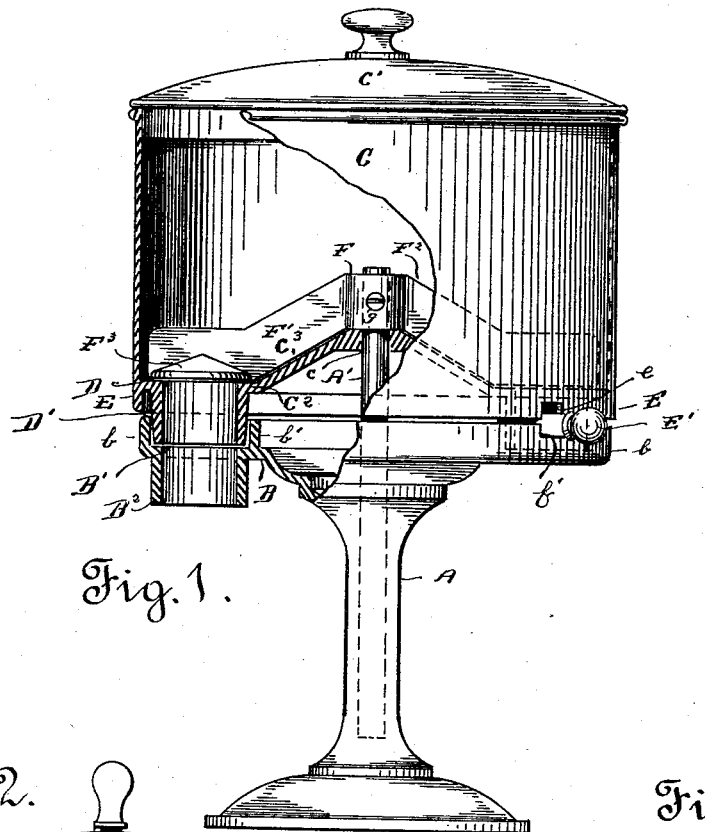

(No Model.) 2 Sheets—Sheet 1.

F. ESPEL.
MEASURING CANISTER.

No. 486,451. Patented Nov. 22, 1892.

Witnesses.
F. Monteverde
W. H. Cobb

Inventor
Ferdinand Espel
By N. A. Acker
atty (No Model.) 2 Sheets—Sheet 2.
F. ESPEL.
MEASURING CANISTER.
No. 486,451. Patented Nov. 22, 1892.
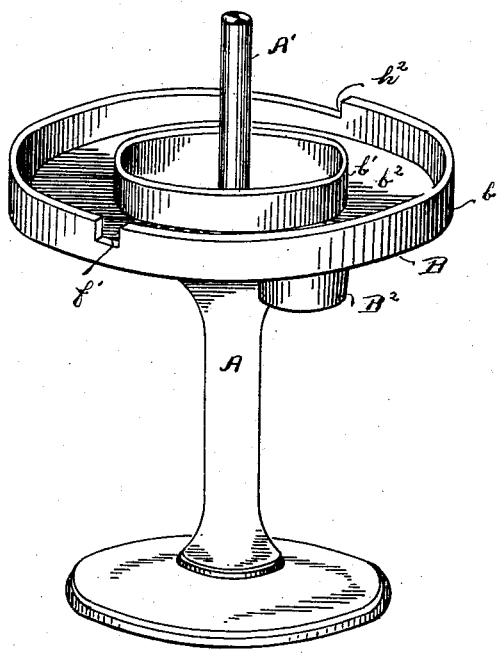
Fig. 4.
Fig. 5.
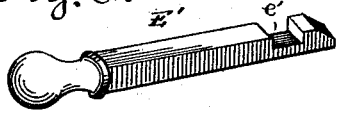
Fig. 6.
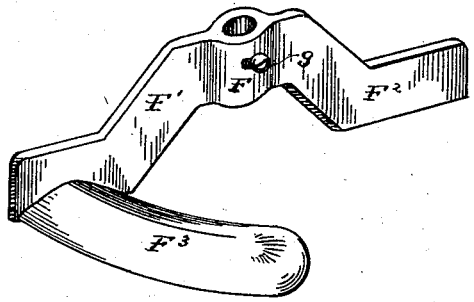
Witnesses:
F. H. Monteverde
W. H. Cobb
Inventor.
Ferdinand Espel
By N. A. Acker
atty

UNITED STATES PATENT OFFICE.

FERDINAND ESPEL, OF SAN FRANCISCO, CALIFORNIA.

MEASURING-CANISTER.

SPECIFICATION forming part of Letters Patent No. 486,451, dated November 22, 1892.

Application filed May 27, 1892. Serial No. 434,530. (No model.)

*To all whom it may concern:*

Be it known that I, FERDINAND ESPEL, a citizen of the United States, residing at San Francisco, in the county of San Francisco and State of California, have invented certain new and useful Improvements in Measuring Devices; and I do hereby declare the following to be a full, clear, and exact description of said invention, such as will enable others skilled in the art to which it most nearly appertains to make, use, and practice the same.

This invention has relation to a certain new and useful measuring device for teas, coffee, &c., which consists in the arrangement of parts and details of construction, as will be hereinafter more fully set forth in the drawings, described, and pointed out in the specification.

Heretofore great annoyance and trouble have been experienced by hotels and restaurants in obtaining an uniform strength and flavor to beverages—such as tea and coffee—owing to the fact that the general measurement has been so many cups or pounds to a given quantity of water. However, it is seldom that in each case the same quantity of tea or coffee is secured within the cup or package. Consequently not only is the uniform quality of the beverage destroyed, but ofttimes a greater quantity is used than necessary to provide a given amount of beverage. Inasmuch as the best quality of beverage is secured by using neither too little nor too much coffee or tea, but only that amount which practice has determined, it will readily be apparent that a uniform measure is indispensable.

The object of my invention is to provide a measuring device which shall permit the withdrawal of only a predetermined quantity of tea or coffee at any one time, thus readily enabling the operator to secure a uniformity in the strength and flavor of his beverage, and at the same time obviate useless waste of material.

Figure 2:
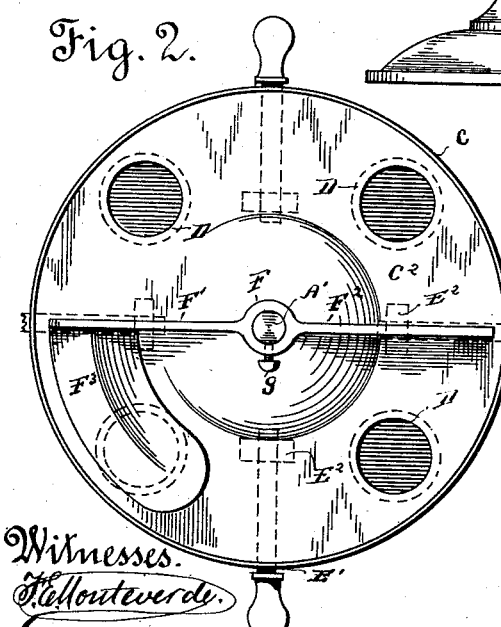
Figure 3:
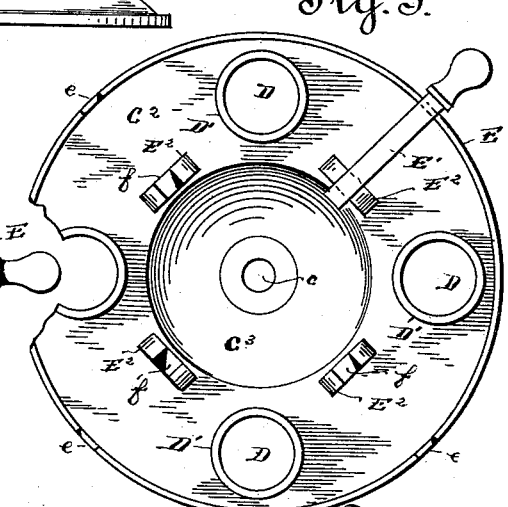

Referring to the drawings forming a part of this application, wherein similar letters of reference are used to denote corresponding parts throughout the entire specification and several views, Figure 1 is an elevation, partly broken away, of the entire device; Fig. 2, a top plan of Fig. 1 with the cover removed; Fig. 3, a bottom plan of the rotatable holding-receptacle; Fig. 4, a perspective view of the stand; Fig. 5, a detail view showing one of the lock-bars, and Fig. 6 a similar view of scraper located within the holding-receptacle.

The letter A is used to represent the stand of my device, which is provided with a vertical projecting shaft A', around which is immovably secured the platform B. The parts may be cast integral or separate, as practice may advise. The platform or plate B is formed with an inner and outer vertical flange $b$ $b'$, which forms an inner annular pathway $b^2$, for the purpose hereinafter set forth. Said platform has cut therein within pathway $b^2$ an outlet-opening B', which has secured therein the downwardly-extending tube or short pipe $B^2$. Upon this platform rests and works a holding receptacle or can C, which is held in place by means of the shaft A', which passes through a central opening $c$, formed in the bottom thereof, and said can or receptacle is adapted to rotate around said shaft in order to discharge the contents thereof through the opening B', as will hereinafter more fully appear. This can is closed by means of a top or cover C' in the usual manner. The bottom $C^2$ has formed therein a series of discharge-openings D, of which two or more may be provided, from which downwardly project thimbles D', Figs. 1 and 3. Inasmuch as the revoluble can or receptacle is supported upon flanges $b$ $b'$ it is obvious that thimbles D', which project below the bottom thereof, travel within the pathway $b^2$. These thimbles register with opening B' during the rotation of the can in order to discharge therethrough, and the size and depth thereof I make sufficient to hold a predetermined quantity of tea, coffee, or other article held within can. The outer downwardly-extending flange or rim E has cut therein openings or sockets $e$, within which rests the outer portion of the lock-bars E', as shown. The inner end or portion of said bar is cut away, as shown at $e'$, and fits within a socket $f$, formed in the downwardly-projecting lugs $E^2$. The under surfaces of these lock-bars bear upon the edge of flanges $b$ $b'$ when the holding-can is in position shown in Fig. 1, and are thus prevented from dropping out of place. Within the vertical flange $b$ I cut a seat or socket $f'$, into which the outer end of the lock-bar falls by gravity as the can is rotated, and thus it locks or prevents the rotation of the holding-can. In order to insure dropping by gravity of the lock-bar within the seat $f'$, I form the projecting end thereof considerably heavier than the inner end, as shown. Seat $f'$ is cut at such a point that when the lock-bar drops into locked engagement therewith the thimble D' will be directly over opening B'. Any number of lock-bars may be employed corresponding with the number of thimbles, and the distance of each should be sufficient to bring one of the thimbles in registering position with opening B' before falling into locked engagement with seat $f'$. These lock-bars may be constructed of any suitable material which will answer the purpose. Within the interior of can or holding-receptacle C is located the scraper, which consists of lateral wings F' F², united to collar F. The collar portion fits upon a vertical shaft projecting through the bottom of can and is held rigidly thereon by means of a set-screw $g$. This scraper remains stationary during rotation of holding-receptacle and serves to force the retained material into thimbles D'. Without the use of this scraper said thimbles would not always fill. Consequently a full quantity would not be discharged through the platform-opening when the thimble registers therewith. Lateral wing F' is provided with a rearwardly-extending tail-piece F³, which in width is equal to the diameter of opening D. This tail-piece completely covers said opening when the thimble D' registers with the opening B', and thus prevents the escape of retained material while that contained within the thimble is being discharged. Inasmuch as the scraper is adjustable upon vertical shaft of the platform, it is obvious that the same may be raised or lowered in order to provide a greater distance between the surface of scraper and the opening connecting with the thimbles, thus allowing for discharging of more material than would otherwise be carried by the thimbles. When at rest, one of the lock-bars always rests within the seat formed in the outer flange of platform. Consequently when it is desired to rotate the holding-receptacle said lock-bar must first be raised from within its seat, when the receptacle may be rotated, the raised lock-bar riding upon vertical flanges. The rotation may continue until the next lock-bar drops into locked engagement with the flange-seat. During this rotation, however, the thimble has been carried such a distance as to move the under tail-piece of the scraper and to register with the outlet-opening of the platform. By preference I place the lateral wings of the scraper at an incline in order to better serve the purpose of forcing the material into the thimbles. If so desired, only one wing need be employed.

While I make mention of my device in connection with the measurement of tea and coffee and for use in hotels and restaurants, it is obvious that it may be employed as a measure of teas, coffees, grain, powder, &c. By sufficiently enlarging the device it may answer the purpose of merchants, inasmuch as the thimbles may be of such size as to discharge in pound-measure.

It is important that the holding-receptacle be always revolved in one direction. Consequently in order to provide against reverse motion thereof I cut away the outer vertical flange of the platform in order to provide the stop-shoulder $h^2$, as shown. In case an attempt should be made to reverse the rotation of the holding-receptacle the lock-bars will contact with said shoulder and thus prevent same. By centrally depressing the bottom C², so as to form an inclined wall C³, I provide for the discharging of all material retained within the holding receptacle or can, which could not be accomplished if the bottom is allowed to be perfectly flat, as is necessarily the case in cans. The scraper also serves as a stirrer, thus preventing the confined material from clogging and becoming lumpy.

I am aware that minor changes may be made in the arrangement of parts and details of construction herein shown and described without necessitating a departure from the nature and scope of my invention.

Having thus described my invention, what I claim as new, and desire to secure protection in by Letters Patent of the United States, is—

1. In a measuring device, the combination, with the platform provided with a discharge-outlet, of the revoluble holding-receptacle mounted thereon, said receptacle having an opening provided in the bottom thereof, the measuring-thimbles secured to the bottom thereof, said thimbles adapted to register with the discharge-opening of the platform during the rotation of the receptacle, and suitable mechanism for locking the holding-receptacle at a predetermined point.

2. The combination, in a measuring device, of the platform, the seat formed in the rim or edge thereof, the discharge-opening cut within the platform, the revoluble holding-receptacle mounted thereon, said receptacle provided with outlet-openings which register with the discharge-opening during the rotation of holding-receptacle, and the lock-bars, said bars adapted to automatically fall into locked engagement with the platform-seat when either of the outlet-openings of the holding-receptacle move into registering position with the discharge-opening of the platform.

3. In a measuring device, the combination, with the revoluble holding-receptacle, said receptacle having openings formed in its bottom, of the scraper secured within holding-receptacle, said scraper adapted to cover the receptacle-openings during rotation thereof, and the measuring-thimbles secured to bottom of holding-receptacle.

4. In a measuring device, the combination, with the platform thereof, the vertical shaft projecting therefrom, the revoluble holding-receptacle secured thereon, openings formed in the bottom thereof, and the thimbles secured to and projecting therefrom, of the scraper located within holding-receptacle, said scraper adapted to cover the openings formed in the receptacle-bottom during the rotation thereof, and a suitable mechanism for locking the revoluble receptacle at a predetermined point.

5. In a measuring device, the combination, with the revoluble holding-receptacle, said receptacle provided with discharge-openings, of the scraper secured therein and adapted to cover each of said openings during one complete revolution of the holding-receptacle and suitable mechanism for locking said receptacle during its rotation.

6. In a measuring device, the combination, with the revoluble holding-receptacle provided with discharge-openings, of the scraper secured therein, said scraper being provided with a projecting piece which is adapted to cover the discharge-openings during the rotation of the holding-receptacle.

7. In a measuring device, the combination, with the platform thereof, of the inner and outer vertical flange projecting therefrom, the outer flange having a seat formed therein, the vertical shaft projecting therefrom, the outlet-opening located within the pathway formed by the inner and outer vertical flange, the revoluble holding-receptacle mounted upon vertical shaft, the opening provided in the bottom of the receptacle, the thimbles secured to and projecting therefrom, said thimbles traveling within the pathway of the platform and adapted with the rotation of the holding-receptacle to register with the outlet-opening of the sockets formed in the lower rim or flange of said receptacle, the downwardly-extending lugs provided with sockets secured to the bottom thereof, the gravity lock-bars secured within the sockets formed in the rim and lugs of the receptacle, said bars adapted to fall into locked engagement with the seat of the platform, and the scraper located within the holding-receptacle.

8. The combination, in a measuring device, of the platform having a seat cut in its outer vertical flange, the revoluble holding-receptacle, said receptacle provided with a depending rim or flange and having downwardly-extending lugs secured to the bottom thereof, the sockets formed in said lugs and rim, and the gravity lock-bars secured therein, said bars during the rotation of receptacle adapted to fall into locked engagement with the platform-seat.

9. In a measuring device, the combination, with the platform thereof, of the outlet-opening formed therein, the revoluble holding-receptacle located thereon, said receptacle having openings formed in the bottom thereof, which register with the outlet-opening during the rotation of said receptacle, and devices for controlling the flow of material through the opening of the receptacle and the platform in order that only a predetermined quantity shall pass therethrough at a given time.

10. In a measuring device, the combination, with the platform, of the discharge-opening formed therein, the revoluble holding-receptacle mounted thereon, said receptacle having openings in its bottom, the measuring-thimbles secured to bottom thereof, and suitable mechanism for automatically locking the holding-receptacle when the same has been rotated such a distance as to cause either of the thimbles to register with the discharge-opening of the platform.

11. In a measuring device, the combination, with a platform having a seat formed in an outer vertical flange thereof, said flange being partly cut away in order to provide a stop-shoulder, of the holding-receptacle mounted thereon and the lock-bars located between holding-receptacle and the platform-flange, said bars adapted to contact with the platform stop-shoulder in order to provide against a reverse rotation of the holding-receptacle.

12. In a measuring device, the combination, with the revoluble holding-receptacle, of the scraper located therein, said scraper provided with lateral wings.

13. In a measuring device, the combination, with a revoluble holding-receptacle, of the scraper provided with lateral wings, one of said wings having a forwardly-projecting piece secured thereto.

In testimony whereof I affix my signature in presence of two witnesses.

FERDINAND ESPEL.

Witnesses:
N. A. ACKER,
J. W. KEYS.